P. J. SHAW.
HARVESTER CUTTING MECHANISM.
APPLICATION FILED APR. 25, 1921.
1,430,408.
Patented Sept. 26, 1922.
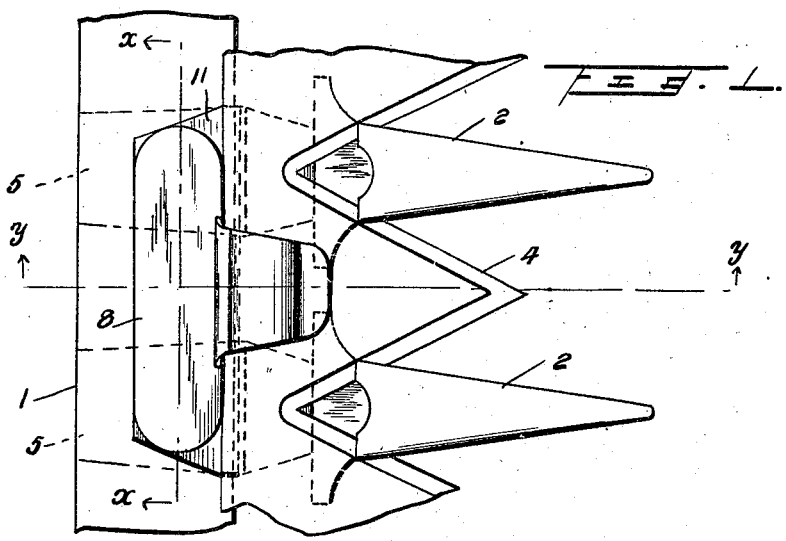
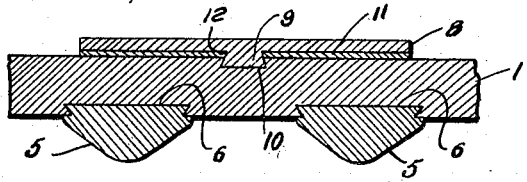
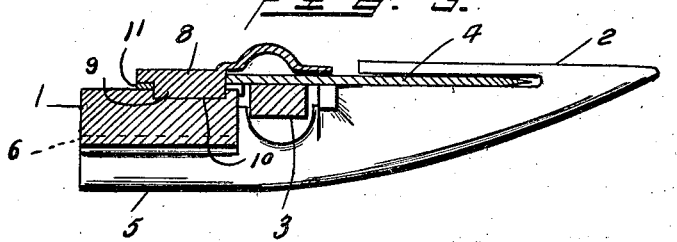
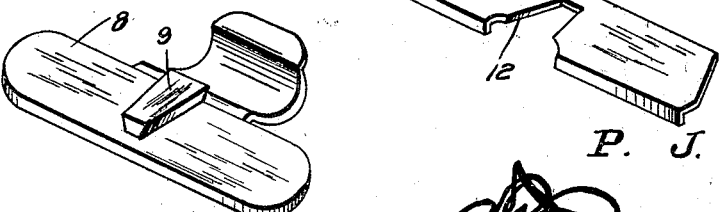
Inventor
P. J. Shaw.
By *[signature]* Attorney Patented Sept. 26, 1922.

1,430,408

UNITED STATES PATENT OFFICE.

PATRICK J. SHAW, OF DIXON, CALIFORNIA.

HARVESTER CUTTING MECHANISM.

Application filed April 25, 1921. Serial No. 464,140.

*To all whom it may concern:*

Be it known that I, PATRICK J. SHAW, a citizen of the United States, residing at Dixon, in the county of Solano and State of California, have invented certain new and useful Improvements in Harvester Cutting Mechanism; and I do hereby declare the following to be a full, clear, and exact description of the invention, such as will enable others skilled in the art to which it appertains to make and use the same.

The invention relates to harvester and mower cutting mechanism and has for its primary object to prevent loosening of the parts and to obviate the use of bolts and analogous fastening means, thereby materially simplifying and cheapening the construction.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a top plan view of parts of a harvester cutting mechanism illustrative of the invention, Figure 2 is a sectional detail on the line $x$—$x$ of Figure 1, Figure 3 is a transverse section on the line $y$—$y$ of Figure 1, Figure 4 is a detail view of the clip, and Figure 5 is a detail view of a wear plate.

Corresponding and like parts are referred to in the following description and designated in the several views of the drawings by like reference characters.

The invention relates to cutting mechanism of the type generally employed in harvesters and mowers and comprises a finger bar 1, guard fingers 2 attached to the bar 1, and a cutter bar 3 provided with blades 4.

Each of the guard fingers 2 is provided with a tapering shank 5 having longitudinal edge portions rabbeted and undercut to provide a dovetail joint between the guard finger and the bar 1. The finger bar 1 is provided in its under side with a plurality of mortises 6, each adapted to receive the tapering shank 5 of a guard finger. The mortises 6 taper throughout their length and the walls at the sides thereof are undercut to match the undercut edge portions of the shank 5 whereby to provide a substantial and firm connection between the guard finger and the supporting bar 1. The mortise engaging portion of the shank 5 is forcibly inserted in the mortise 6 to prevent any possible loosening of the parts after being properly assembled.

The cutter bar 3 is retained in place by means of clips 8, each clip being provided upon its under side with a wedge shaped block 9 adapted to engage a corresponding mortise 10 formed in the top side of the bar 1. The block 9 tapers throughout its length and its opposite edges are undercut or beveled so as to lockingly engage the side walls of the mortise 10, Fig. 2. The block 9 is pressed into the mortise 10 to provide a durable and positive connection.

The wear plate 11, fitted to the upper side of the finger bar 1, is provided with wedge shaped mortises 12 to conform to the blocks 9 which fit therein and hold the wear plate in position.

By reason of the wedge shaped connections or dovetailed joints, the parts are prevented from becoming loose and it is possible to dispense with bolts or analogous fastenings commonly employed for securing the parts when assembled. Likewise the construction is materially cheapened and simplified.

What is claimed is:

1. In harvester cutting mechanism, a finger bar provided with a wedge shaped mortise and a clip having a wedge shaped block for snugly fitting the said mortise.

2. In harvester cutting mechanism, a finger bar having a wedge shaped mortise, a wear plate having a corresponding mortise registering with the mortise of the finger bar, and a clip provided with a wedge shaped block snugly fitting the mortises of the wear plate and finger bar.

In testimony whereof I affix my signature in presence of two witnesses.

PATRICK J. SHAW

Witnesses:
D. A. S. ALMEIDA,
J. F. WINTER.